United States Patent [19]

Vander Kooi

[11] 3,915,940

[45] Oct. 28, 1975

[54] INHIBITING PREMATURE VULCANIZATION OF DIENE RUBBERS WITH N-THIOSULFONAMIDES

[75] Inventor: John P. Vander Kooi, Akron, Ohio

[73] Assignee: Monsanto Company, St. Louis, Mo.

[22] Filed: Aug. 29, 1973

[21] Appl. No.: 392,801

Related U.S. Application Data

[63] Continuation-in-part of Ser. No. 102,213, Dec. 28, 1970, abandoned.

[52] U.S. Cl.... 260/79.5 B; 260/79.5 A; 260/453 R; 260/556; 260/780; 260/785

[51] Int. Cl.² ..................... C08C 11/54; C08D 9/00; C08C 11/62

[58] Field of Search .......... 260/79.5 A, 79.5 B, 780

[56] References Cited

UNITED STATES PATENTS 3,678,017  7/1972  Shelton .......................... 260/79.5 B Primary Examiner—Christopher A. Henderson, Jr.

[57] ABSTRACT

Sulfonamides substituted on the nitrogen by an organic thio substituent are used to inhibit premature vulcanization of diene rubbers.

22 Claims, No Drawings

INHIBITING PREMATURE VULCANIZATION OF DIENE RUBBERS WITH N-THIOSULFONAMIDES

This application is a continuation-in-part of application Ser. No. 102,213 filed Dec. 28, 1970 now abandoned the disclosure of which is incorporated herein by reference.

This invention relates to an improved process for preparing vulcanizable rubber and to the rubber stocks obtained by using the improved process. The invention relates to improved accelerator-inhibitor combinations for rubber. The invention also relates to new compounds useful as inhibitors of premature vulcanization in rubber. More particularly, the invention relates to a method for preventing the premature vulcanization of rubber stocks and to the rubber stocks obtained by using this method.

BACKGROUND OF THE INVENTION

In the manufacture of vulcanized rubber products, crude rubber is combined with various other ingredients such as fillers, accelerators, and antidegradants to alter and improve processing of the rubber and to improve the properties of the final product. The crude rubber is put through several steps in the plant before it is ready for the final step of vulcanization. Generally the rubber is mixed with carbon black and other ingredients except the vulcanizing agent and accelerator. Then the vulcanizing and accelerating agents are added to this masterbatch in a Banbury mixer or a mill. Scorching, viz., premature vulcanization, can occur at this stage of the processing, during the storage period before vulcanizing, and during the actual vulcanization. After the vulcanizing and accelerating agents are added, the mixture of crude rubber is ready for calendering or extruding and vulcanization. If premature vulcanization occurs during the storage of the crude mixture or during processing prior to vulcanization, the processing operations cannot be carried out because the scorched rubber is rough and lumpy, consequently useless. Premature vulcanization is a major problem in the rubber industry and must be prevented in order to allow the rubber mix to be preformed and shaped before it is cured or vulcanized.

The development of high pH furnace blacks which lack the inherent inhibiting effect of the acidic channel blacks and the popularity of certain phenylenediamine antidegradants which promote scorching have placed increasingly stringent demands on the curing system. Premature vulcanization has been partially controlled by delayed-action accelerators of which the thiazole-sulfenamides are a notable example, either alone or in combination with retarders and activators. An accelerator selected for its processing safety may require a secondary accelerator for satisfactory curing properties. Certain sulfonamides were shown by Tomlin to be strong activators of vulcanization when used as secondary accelerators, although they had little accelerating action when used alone. U.S. Pat. No. 2,590,737, Mar. 25, 1952. Retarders include N-nitrosodiphenylamine, salicylic acid, and a terpene-resin acid blend. See Editors of *Rubber World*, "Compounding Ingredients for Rubber," 91–94 (3rd Ed., 1961). Acids as retarders are generally ineffective with thiazole-sulfenamide accelerators or adversely affect the vulcanizing process. Nitrosoamine retarders are only of limited effectiveness with thiazolesulfenamides derived from primary amines.

SUMMARY OF THE INVENTION

A class of sulfonamides has been discovered which inhibit premature vulcanization. They are characterized by the presence of an organic thio substituent on the sulfonamide nitrogen. The characteristic nucleus is

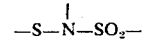

although more than one such nucleus may be present. The term "sulfonamide" is used in a generic sense to include sulfondiamides or sulfamides in which case the dangling valence on the $-SO_2-$ is linked to another nitrogen which may also contain a thio substituent. The property of inhibiting prevulcanization appears to be a general characteristic of organic thiosubstituted sulfonamides. Illustrative of monomeric thiosulfonamides found useful for inhibiting prevulcanization are those represented by the general formula

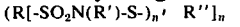

where $n$ is 1, 2 or 3 and $n'$ is 1 or $n'$ is 1, 2, 3 or 4 and $n$ is 1, R and R'' are organic radicals and R' is hydrogen or an organic radical, the organic radicals represented by R, R' and R'' preferably being hydrocarbons of 1–12 carbon atoms.

When $n'$ is 1, R'' is monovalent and the compounds are derivatives of monomercaptans. R'' is then aryl, alkyl, alicyclic where aryl and alicyclic include fused rings or any combination thereof, for example, alkaryl, aralkyl, alkylalicyclic or fused bicyclic ring having an aromatic ring condensed with a non-aromatic ring illustrated by tetrahydronaphthyl and indanyl. For convenience, aryl is used in the usual generic sense to mean any univalent organic radical the free valence of which belongs to an aromatic carbocyclic nucleus and includes alkaryl, bicyclic radicals containing one aromatic ring where the valence is on that ring and radicals substituted in the carbocyclic nucleus by alkoxy, chloro, bromo, fluoro or iodo but preferably contains no more than 12 carbon atoms and not more than one electronegative substituent. Thus, aryl may be phenyl, naphthyl or xenyl, preferably unsubstituted except for lower alkyl. Alkyl means a univalent aliphatic hydrocarbon radical of the series $C_nH_{2n+1}$ where $n$ is 1–20, preferably 1–12, which may be primary, secondary or tertiary where the chain or chains attached to the primary, secondary or tertiary carbon are straight or branched. Cycloalkyl means cyclic aliphatic radicals and preferably contain 5 to 12 carbon atoms in the carbocyclic ring, which ring is unsubstituted except for lower alkyl. Aralkyl means aryl substituted alkyl. Lower alkyl of 1 to 5 carbon atoms inclusive substituted by phenyl are the preferred aralkyl substituents.

When $n$ is 1, R is of course monovalent and is independently selected from the same group of monovalent radicals as R''. Regardless of the value of $n$ and $n'$, R' either is hydrogen, is independently selected from the same group of monovalent organic radicals as R'' or completes a thio bis sulfonamide in which two sulfonamides are linked through nitrogen to a divalent radical. Such thio bis sulfonamides, the starting materials for which are derived from diamines, are a valuable class, examples of which may be represented by designating R' as

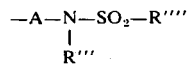

and the complete formula for a representative subgroup from diamines when $n$ is 1 becomes

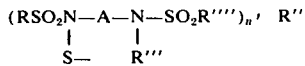

where A is alkylene, arylene or cycloalkylene preferably of 1 to 12 carbon atoms illustrative of which are divalent radicals derived by removal of two hydrogen atoms from methane, propane, cyclohexane, isopropane, butane, isobutane, pentane, hexane, heptane, octane, benzene, toluene, diphenyl or from each methyl of p-xylene (phenylenedimethylene) herein regarded as alkylene. R''' is hydrogen, R'' or R''S where R'' is the same univalent radical as before, R'''' is univalent R'' and the meaning of R'' outside the parentheses depends upon the value of $n'$. For example, when $n'$ is 2, R'' is selected from the same group as A and when 3 or 4 is tri- or tetravalent as hereinafter illustrated.

Sulfondiamides or sulfamides characterized by having two nitrogen atoms linked to the same —$SO_2$— are a valuable class, typical example of which when $n$ is 1 may be represented by the formula

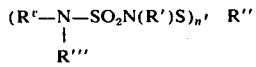

where R' has the same meaning as before but is preferably hydrogen or independently selected from the same group of univalent radicals as R'' and R of the general formula becomes

where $R^r$ is hydrogen or has the same meaning as monovalent R'' and R'''' again is hydrogen, R'' or R''S— where R'' is the same univalent radical as before. The meaning of R'' outside the parentheses again depends upon the value of $n'$, being univalent R'' when $n'$ is 1, selected from the same group as A above when $n'$ is 2 or tri- and tetra-valent organic radicals when $n'$ is 3 and 4, respectively.

Sulfondiamides having —SR radicals attached to each of the nitrogen atoms linked to —$SO_2$— are a preferred class which may be represented by the formula
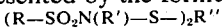
where each R is independently selected from the group consisting of aryl where aryl is phenyl, naphthyl or xenyl; substituted said aryl wherein the substituents are lower alkyl, halogen, lower alkoxy or combinations thereof; alkyl hydrocarbon of 1 to 20 carbon atoms; phenyl substituted lower alkyl hydrocarbon; unsubstituted mono- and bicycloalkyl of 5 to 12 ring members; lower alkyl substituted mono- and bicycloalkyl of 5 to 12 ring members and fused bicyclic rings of phenyl and a non-aromatic hydrocarbon ring, where each R' independently is hydrogen or selected from the same group as R.

Disulfonamides wherein two sulfonamide nuclei are linked through dilvalent sulfur to divalent R'' ($n'$ is 2) are valuable prevulcanization inhibitors which may be represented by the formula
$(R-SO_2N(R')-S-)_2R''$
where R'' is divalent organic selected from the same class as A above, lower alkylene=$(OOCCH_2)_2$ or lower alkylene=$(OOCCH_2CH_2-)_2$ and preferably hydrocarbon of 1–12 carbon atoms, R is a monovalent organic radical having the same meaning as before when monovalent and R' has the same meaning as before but is preferably hydrogen or independently selected from the same group as R.

Tri- and tetrasulfonamides wherein three or four sulfonamide nuclei are linked through divalent sulfur to tri- or tetravalent R'' ($n'$ is 3 or 4) may be represented by the formula $(RSO_2N(R')S-)_{n'}R''$ where R is a monovalent organic radical having the same meaning as before when monovalent and R' has the same meaning as before but is preferably hydrogen or independently selected from the same group as R, when $n'$ is 3, R'' is lower alkanetriyl (derived by removal of an additional hydrogen atom from alkylene), phenenyl, lower alkyl—$C(CH_2OOCCH_2-)_3$ or lower alkyl—$C(CH_2OOCCH_2CH_2-)_3$; when $n'$ is 4, R'' is lower alkanetetrayl (derived by removal of two additional hydrogen atoms from alkylene), $C(CH_2OOCCH_2-)_4$ or $C(CH_2OOCCH_2CH_2-)_4$.

When $n$ is 3 and $n'$ is 1, prevulcanization inhibitors are represented by the formula $R(-SO_2N(R')-S-R'')_3$ where R is trivalent, for example, phenenyl, R' has the same meaning as before but is preferably hydrogen or independently selected from the same group of monovalent radicals as R'' and R'' is a monovalent radical previously defined.

The compounds conforming to the aforesaid formulas are produced by condensing an N-halosulfonamide with mono- or dimercaptans or by converting the mercaptan to a sulfenyl halide and condensing the halide with a sulfonamide having a reactive hydrogen on the nitrogen. When a dimercaptan is reacted with a sulfonamide containing more than one reactive sulfonamide nucleus, polymers form which are also useful inhibitors of prevulcanization. If both R and R'' of the general formula for monomers are converted to divalent radicals, polymeric forms of thiosulfonamides result. For example, in the formula previously described for monomers from diamines

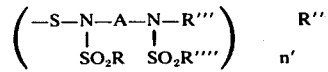

where R may represent hydrogen, polymers arise when the said hydrogen is replaced by reacting with a mercaptan having more than one mercaptan radical and R'' is then more than univalent. R''' may represent R''S— where R'' is univalent and R'' outside the parentheses may be divalent which situation arises if one hydrogen is replaced by reaction with a monomercaptan and the hydrogen of the second nitrogen replaced by reacting with a di-, tri- or tetramercaptan. However, if both R'' of R''S— within the parentheses and R'' outside the parentheses are divalent or higher, polymers result which are conveniently depicted by the following repeating unit

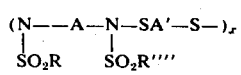

where $x$ is an integer greater than one but probably less than 20, R and R'''' have the same meaning as monovalent R'', A has the same meaning as before and A' is independently selected from the same group as A. Another typical polymer contains the repeating unit

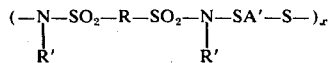

where $x$ is an integer greater than one, probably less than 20, R has the same meaning as before when divalent and A' and R' have the same meaning as before. These differ from the monomeric form of disulfonamides previously described having two sulfonamide nuclei linked through —SO$_2$— of the formula

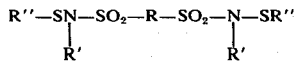

in that monovalent R'' becomes divalent and designating it A' the repeating unit becomes

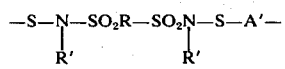

Sulfamide polymers may be represented as

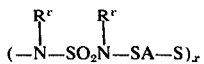

where $x$, R$^r$ and A have the same meaning as before.

Polymers also form from the reaction of tri- and tetra-mercaptans and sulfonamides containing more than one reactive site. For the preparation of such polymers and for preparation of monomers where $n'$ is 3 or 4, tri- and tetramercaptans are required. Among those available and suitable for use in preparing embodiments of the invention are 1,2,3-propanetrithiol, 1,2,3-benzenetrithiol, 1,3,5-benzenetrithiol, 1,2,3,4-butanetetrathiol, neopentanetetrathiol, pentaerylthritol tetra(3-mercaptopropionate), C(CH$_2$OOCCH$_2$CH$_2$SH)$_4$, pentaerylthritol tetra(thioglycolate), C(CH$_2$OOCCH$_2$SH)$_4$, trimethylolethane tri(3-mercaptopropionate), CH$_3$C(CH$_2$OOCCH$_2$CH$_2$SH)$_3$, trimethylolethane trithioglycolate, CH$_3$C(CH$_2$OOCCH$_2$SH)$_3$, and trimethylolpropane trithioglycolate, CH$_3$CH$_2$C(CH$_2$OOCCH$_2$SH)$_3$. Similarly, dimercaptans suitable for reaction with sulfonamides to prepare embodiments of the invention include esters of mercaptocarboxylic acids, for example, glycol dimercaptoacetate, C$_2$H$_4$(OOCCH$_2$SH)$_2$, glycol dimercaptopropionate and others of the formula lower alkylene bis-(OOC(CH$_2$)$_{n''}$—) where $n''$ is 1 or 2.

DESCRIPTION OF PREFERRED EMBODIMENTS

The preferred inhibitors are those in which R'' is cyclohexyl or phenyl and various cycloalkylthiosulfonamides are selected to illustrate this phase of the invention. It will be understood that the corresponding phenyl compounds are similarly effective and that the substitution of cyclohexyl or phenyl by other radicals disclosed as representative of R'' yields compounds of valuable inhibiting properties but not necessarily equivalent.

Typical sulfondiamide inhibitors of this invention having the formula

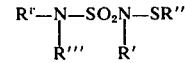

are illustrated by N-(cyclohexylthio)-N,N'-dicyclohexylsulfamide, N-(cyclohexylthio)sulfanilide, N-(cyclohexylthio)sulfamide, N,N'-(dicyclohexylthio)-N,N'-dimethylsulfamide, N,N'-(dicyclohexylthio)-N,N'-di-n-butylsulfamide, N,N'-(diphenylthio)-N,N'-dicyclohexylsulfamide, N,N'-(diphenylthio)sulfanilide, N,N'-(diphenylthio)-sulfamide, N,N'-(diphenylthio)-N,N'-dimethylsulfamide, N,N'-(diphenylthio)-N,N'-di-n-butylsulfamide, N,N'-(diisopropylthio)-N,N'-dicyclohexylsulfamide, N,N'-(diisopropylthio)sulfanilide, N,N'-(diisopropylthio)sulfamide, N,N'-(diisopropylthio)-N,N'-dimethylsulfamide, N,N'-(diisopropylthio)-N,N'-di-n-butylsulfamide, N,N'-(dibenzylthio)-N,N'-dicyclohexylsulfamide, N,N'-(dibenzylthio)sulfanilide, N,N'-(dibenzylthio)sulfamide, N,N'-(dibenzylthio)-N,N'-dimethylsulfamide, N,N'-(dibenzylthio)-N,N'-di-n-butylsulfamide, N,N'-(dicyclohexylthio)-N-methylsulfamide, N,N'-(diphenylthio)-N-methylsulfamide, N,N'-(diisopropylthio)-N-methylsulfamide, N,N'-(dibenzylthio)-N-methylsulfamide, N,N'-(dimethylthio)sulfamide, N,N'-(diethylthio)-sulfanilide, and N,N'-(di-tert-butylthio)sulfamide.

Typical inhibitors of this invention having the formula

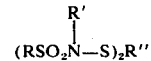

derived from dimercaptans are illustrated by 1,2-bis(N-thiomethanesulfonamido)ethane, 1,2-bis(N-thio-benzenesulfonamido)ethane, 1,2-bis(N-thiotoluenesulfonamido)-ethane, 1,2-bis(N-methyl-N-thiomethanesulfonamido)ethane, 1,2-bis(N-methyl-N-thiotoluenesulfonamido)ethane, 1,6-bis-(N-methyl-N-thiomethanesulfonamido)hexane, 1,4-bis(N-methyl-N-thiomethanesulfonamido)butane, 1,4-bis(N-thiomethanesulfonamido)benzene, 1,4-bis(N-thiobenzenesulfonamido)benzene, 1,4-bis(N-thiotoluenesulfonamido)benzene, 1,4-bis(N-methyl-N-thiomethanesulfonamido)benzene, 1,4-bis(N-methyl-N-thiotoluenesulfonamido)benzene, 1,4-bis(N-thiomethanesulfonamido)cyclohexane, 1,4-bis(N-thiobenzenesulfonamido)cyclohexane, 1,4-bis-(N-thiotoluenesulfonamido)cyclohexane, 1,4-bis(N-methyl-N-thiomethanesulfonamido)cyclohexane, and 1,4-bis(N-methyl-N-thiotoluenesulfonamido)cyclohexane.

Typical inhibitors of this invention having the formula (RSO$_2$N(R')S—)$_{n'}$ R'' where $n'$ is 3 or 4 are illustrated by 1,2,3-tri(N-thiomethanesulfonamido)propane, 1,2,3-tri-(N-thiobenzenesulfonamido)propane, 1,2,3-tri(N-thiotoluenesulfonamido)propane, 1,2,3-tri(N-methyl-N-thiomethanesulfonamido)propane, 1,2,3-tri-(N-methyl-N-thiotoluenesulfonamido)-propane, 1,3,5-tris(N-thiomethanesulfonamido)benzene, 1,3,5-tris(N-thiobenzenesulfonamido)benzene, 1,3,5-tris(N-thio-toluenesulfonamido)benzene, 1,3,5-tris(N- methyl-N-thiomethanesulfonamido)benzene, 1,3,5-tris(N-methyl-N-thiotobenesulfonamido)benzene, 1,2,3,4-tetra(N-thiomethanesulfonamido)butane, 1,2,3,4-tetra(N-thiobenzenesulfonamido)butane, 1,2,3,4-tetra-(N-thiotoluenesulfonamido)butane, 1,2,3,4-tetra-(N-methyl-N-thiomethanesulfonamido)-butane, 1,2,3,4-tetra-(N-methyl-N-thiotoluenesulfonamido)butane, 1,3-(N-thiomethanesulfonamido)-2,2'-(N-thiomethanesulfonamidomethyl)propane, 1,3-(N-thio-benzenesulfonamido)-2,2'-(N-thiobenzenesulfonamidomethyl)propane, 1,3-(N-thiotoluenesulfonamido)-2,2'-(N-thiotoluenesulfonamidomethyl)-propane, 1,3-(N-methyl-N-thiomethanesulfonamido)-2,2'-(N-methyl-N-thiomethanesulfonamideomethyl)-propane, and 1,3-(N-methyl-N-thiotoluenesulfonamido)-2,2'-(N-methyl-N-thiotoluenesulfonamidomethyl)propane.

Rubber stocks containing delayed-action accelerators can be used in the process of this invention. Cheaper, more scorchy accelerators can also be used with an excellent degree of improvement. The improved vulcanizing process of this invention can be used advantageously to process stocks containing furnace blacks as well as stocks containing other types of blacks and fillers used in rubber compounding. The invention is also applicable to gum stocks.

The invention is applicable to rubber mixes containing sulfur-vulcanizing agents, organic accelerators for vulcanization, and antidegradants, none being the inhibitor used. For the purposes of this invention, sulfur-vulcanizing agent means elemental sulfur or sulfur-containing vulcanizing agent, for example, an amine disulfide or a polymeric polysulfide. The invention is applicable to vulcanization accelerators of various classes. For example, rubber mixes containing an aromatic thiazole accelerator which includes N-cyclohexyl-2-benzothiazolesulfenamide, 2-mercaptobenzothiazole, 2,2'-dithiobisbenzothiazole, N-tert-butyl-2-benzothiazolesulfenamide, 2-benzothiazolyl diethyldithiocarbamate, and 2-(morpholinothio)benzothiazol can be used. Amine salts of mercaptobenzothiazole accelerators, for example, the t-butylamine salt of mercaptobenzothiazole, like salts of morpholine, and 2,6-dimethylmorpholine, can be used in the invention. Thiazole accelerators other than aromatic can be used. Stocks containing accelerators, for example, tetramethylthiuram disulfide, tetramethylthiuram monosulfide, aldehyde amine condensation products, thiocarbamylsulfenamides, thioureas, metal dithiocarbamates, alkyldithiocarbamates, hexamethylenetetramine, xanthates, and guanidine derivatives, are substantially improved using the process of the invention. Examples of thiocarbamylsulfenamide accelerators are shown in U.S. Pat. No. 2,381,392, Smith assigned to Firestone, U.S. Pat. No. 2,388,236, Cooper assigned to Monsanto, U.S. Pat. No. 2,424,927, Smith assigned to Firestone, and British Pat. No. 880,912, Dadson assigned to Imperial Chemical Industries Limited. The invention is applicable to stocks containing mixtures of accelerators and to stocks containing amine antidegradants. Rubber mixes containing antidegradants, for example, N-1,3-dimethylbutyl-N'-phenyl-p-phenylenediamine, N,N'-bis(1,4-dimethylpentyl)-p-phenylenediamine, and other phenylenediamines, ketone, ether, and hydroxy antidegradants and mixtures thereof, are substantially improved using the process of the invention. Mixtures of antidegradants, for example, a mixture of N-1,3-dimethylbutyl-N'-phenyl-p-phenylenediamine and N,N'-bis(1,4-dimethylpentyl)-p-phenylenediamine, furnish a much improved final product when used with the inhibitors of this invention.

The inhibitors of the invention can be used in natural and synthetic rubbers and mixtures thereof. Synthetic rubbers that can be improved by the process of this invention include cis-4-polybutadiene, butyl rubber, ethylene-propylene terpolymers, polymers of 1,3-butadiene, for example, 1,3-butadiene itself and of isoprene, copolymers of 1,3-butadiene with other monomers, for example, styrene, acrylonitrile, isobutylene, and methyl methacrylate. The invention relates to diene rubbers, and the terms rubber and diene rubber are synonymous for the purpose of this invention.

The compounds are preferably prepared by condensing the corresponding sulfenyl halide with a sulfonamide having reactive hydrogen on the amide nitrogen in the presence of a hydrogen halide acceptor. The general reaction employing a sulfenyl chloride and a sulfonamide in which $n'$ is 1 is

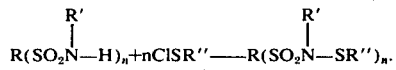

Starting with $R-SO_2N(H)AN(H)SO_2R'$ or $R''''N(H)SO_2N(H)R'$ one or both of the nitrogen atoms is readily substituted by $-SR''$ depending upon the molecular ratio of $ClSR''$. Two molecular proportions of $ClSR''$ per mole of sulfamide results in substitution on both nitrogen atoms. Any hydrogen chloride acceptor may be employed examples of which are tertiary amines and alkali metal hydroxides. The reactions are conveniently effected in organic solvents, for example, benzene, toluene, xylene, chlorobenzene, chloroform, carbon tetrachloride or hexane. An aqueous phase of dilute alkali metal hydroxide may be present which provides a convenient source of hydrogen halide acceptor. The reactions are usually slightly exothermic and take place rapidly at ordinary temperatures upon mixing the reactants. The reactions are usually essentially complete after gradually adding a solution of the sulfenyl halide to a solution of the sulfonamide.

Preparation of the new compounds is illustrated in detail by the following representative examples.

EXAMPLE I

Into a suitable reactor is charged 6.5 grams (0.025 mole) of N,N'-diphenyl sulfondiamide ($C_6H_5NH)_2SO_2$, 6 grams of triethylamine and 100 ml. of benzene. There is gradually added 0.075 mole of cyclohexylsulfenyl chloride. After addition is complete, the reaction mixture is filtered, the benzene removed by distillation and the residue treated with hexane to obtain a dark solid which is recrystallized from methanol. The product is N,N'-diphenyl-N,N'-dicyclohexylthio sulfondiamide, a white solid, m.p. 105°–107°C. Analysis by NMR confirms its identity.

Replacing cyclohexylsulfenyl chloride by an equal mole quantity of 1,2-ethanedisulfenylchloride yields a prevulcanization inhibitor in the form of a polymer in which the repeating unit is

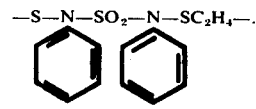

EXAMPLE II

A glass or glass-lined reactor is charged with 37 grams (0.2 mole) of N-methyl-p-toluenesulfonamide, 24.5 grams of collidene and 350 ml. of dimethylformamide. There is then gradually added at room temperature substantially 0.1 molecular proportion of 1,2-ethanedisulfenylchloride prepared by adding 14 grams of chlorine to 9.4 grams of 1,2-ethanedithiol in benzene. After addition is complete, stirring is continued for a few minutes, the reaction mixture filtered and the solvent removed from the filtrate by distillation. The product which remains is 1,2-bis(N-methyl-N-thio-p-toluenesulfonamido)ethane, a solid which after recrystallizing from hexane has a melting point of 172°–174°C. Analysis by NMR confirms its identity.

EXAMPLE III

A glass or glass-lined reactor is charged with 32.6 grams (0.14 mole) of N-(n-butyl)-p-toluenesulfonamide, 21.0 grams of triethylamine and 350 ml of benzene. There is then gradually added at room temperature substantially 0.1 molecular proportion of 1,2-ethanedisulfenylchloride prepared in the same manner as in Example II. After addition is complete, stirring is continued for one hour, the reaction mixture filtered and the solvent removed from the filtrate by distillation. The product which remains is 1,2-bis(N-n-butyl-N-thio-p-toluenesulfonamido)ethane, a solid which, after recrystallizing from methanol, has a melting point of 91°–92°C. Analysis by NMR confirms its identity.

The following tables illustrate the invention in greater detail and the best mode for carrying it out, but are not to be construed as to narrow the scope of the invention. For all the rubber stocks tested and described, infra, as illustrative of the invention, Mooney scorch times are determined by means of a Mooney plastometer. The time in minutes ($t_5$) required for the Mooney reading to rise five points above the minimum viscosity is recorded. Longer times are indicative of the activity of the inhibitor. Longer times on the Mooney Scorch Test are desirable because this indicates greater processing safety. Curing characteristics are determined by means of the Monsanto Oscillating Disk Rheometer described by Decker, Wise and Guerry in *Rubber World*, December, 1962, page 68. From the Rheometer data, $R_{max}$ is the maximum torque in Rheometer units, $t_2$ is the time in minutes for a rise of two Rheometer units above the minimum reading and $t_{90}-t_2$ is the difference in time required to obtain a torque 90% of the maximum and $t_2$.

Table I illustrates the results of using N-(cyclohexylthio)benzenesulfonanilide and N-(phenylthio)-N-methyl-p-toluenesulfonamide as premature vulcanization inhibitors in stocks of natural rubber containing a p-phenylenediamine antioxidant and antiozonant and delayed-action sulfenamide accelerator. From the data of Table I it will be noted that the illustrative inhibitors are quite active in the presence of the accelerator and antioxidant as premature vulcanization inhibitors.

Table 1

|  | Parts by Weight | | | |
| --- | --- | --- | --- | --- |
|  | A | B | C | D |
| Natural rubber smoked sheets | 100 | 100 | 100 | 100 |
| Furnace carbon black (ISAF) | 45 | 45 | 45 | 45 |
| Zinc oxide | 3 | 3 | 3 | 3 |
| Stearic acid | 2 | 2 | 2 | 2 |
| Hydrocarbon softener | 5 | 5 | 5 | 5 |
| Sulfur | 2 | 2 | 2 | 2 |
| N—1,3—Dimethylbutyl—N'—phenyl—p—phenylenediamine | 2 | 2 | 2 | 2 |
| N—tert—Butyl—2—benzothiazolesulfenamide | 0.5 | 0.5 | 0.5 | 0.5 |
| N—Cyclohexylthiobenzenesulfonanilide | — | 0.2 | 0.4 | — |
| N—Phenylthio—N—methyl—p—toluenesulfonamide | — | — | — | 0.4 |
| Mooney Scorch at 121°C. | | | | |
| $t_5$ | 27.7 | 38.8 | 46.4 | 47.1 |
| Rheometer at 144°C. | | | | |
| $t_2$ | 7.6 | 9.6 | 11.5 | 10.8 |
| $t_{90}-t_2$ | 12.6 | 12.4 | 12.6 | 12.0 |
| $R_{max}$ | 64 | 66 | 66 | 69 |

Comparable results to those in the table illustrating utility are obtained with inhibitors of this invention which are not illustrated. Concentration studies show that the inhibitors are effective in rubber at concentrations of 0.05 to 5.0 parts by weight per hundred of rubber within which range 0.1 to 3.0 parts by weight per hundred of rubber are preferred.

As illustrative of the improvement obtained over a control stock having the composition of Stock A above by incorporating 0.4 prevulcanization inhibitor therein, percentage increases in scorch delay are calculated by dividing the Mooney scorch time of the stock containing the prevulcanization inhibitor by the Mooney scorch time of the control stock, multiplying by 100 and subtracting 100. These increases, summarized in Table II, show the percent of improvement in scorch delay over the control stock which contains no inhibitor.

Table II

|  | % Increase of Scorch Delay |
| --- | --- |
| N-Phenylthio-N-methyl-p-toluenesulfonamide | 69 |
| N-Cyclohexylthio-p-toluenesulfonamide | 75 |
| N-Cyclohexylthio-N-methylbenzenesulfonamide | 57 |
| N-Cyclohexylthio-N-benzylbenzenesulfonamide | 40 |
| N-(Phenylthio)benzenesulfonanilide | 24 |
| N-(Cyclohexylthio)benzenesulfonanilide | 67 |

Table II-continued

|  | % Increase of Scorch Delay |
|---|---|
| N-p-Nitrophenylthio-N-methyl methanesulfonamide | 28 |
| N-p-Nitrophenylthio-p-toluenesulfonamide | 3 |
| N-Phenylthio-N-methyl methanesulfonamide | 90 |
| N-Cyclohexylthio-N-methyl methanesulfonamide | 46 |
| N,N'-Diphenyl-N,N'-dicyclohexylthiosulfondiamide | 59 |
| N-sec-Butylthio-N-methyl-p-toluenesulfonamide | 40 |
| 1,2-Bis(N-methyl-N-thio-p-toluenesulfonamido) ethane | 70* |
| 1,2-Bis(N-n-butyl-N-thio-p-toluenesulfonamido) ethane | 76* |

The adverse effect of the strong electronegative nitro substituent is apparent in the foregoing illustrative data.

Table III illustrates the premature vulcanization inhibitor properties in a styrene-butadiene rubber composition. A base composition is compounded comprising:

|  | Parts by Weight |
|---|---|
| Oil-extended styrene-butadiene rubber containing 37.5% highly aromatic oil | 137.5 |
| Intermediate super abrasion furnace black | 65 |
| Zinc oxide | 3 |
| Stearic acid | 1 |
| Hydrocarbon softener | 1.5 |
| N-tert-Butyl-2-benzothiazolesulfenamide | 1.0 |
| N-1,3-Dimethylbutyl-N'-phenyl-p-phenylenediamine | 2.0 |
| Sulfur | 2.0 |

*0.5 parts inhibitor used

To the base composition 0.4 parts by weight of prevulcanization inhibitor is added and the Mooney Scorch Time is determined at 135°C.

Table III

|  | Mooney Scorch at 135°C ($t_5$) Minutes |
|---|---|
| None - control | 20.1 |
| N-Cyclohexylthio-p-toluenesulfonamide | 23.6 |
| N-Cyclohexylthio-N-methylbenzenesulfonamide | 24.6 |
| N-Cyclohexylthio-N-benzylbenzenesulfonamide | 22.1 |
| N-Phenylthiobenzenesulfonanilide | 22.1 |
| N-Cyclohexylthiobenzenesulfonanilide | 27.7 |
| N-p-Nitrophenylthio-N-methyl methanesulfonamide | 22.7 |

A twenty-five percent increase in Mooney Scorch Time is obtained by adding 0.5 parts by weight of 1,2-bis-(N-n-butyl-N-thio-p-toluenesulfonamido)ethane to the above described styrene-butadiene rubber composition.

It is intended to cover all changes and modifications of the examples of the invention herein chosen for purposes of disclosure which do not constitute departures from the spirit and scope of the invention. The matter contained in each of the following claims is to be read as part of the general description of the present invention.

The embodiments of the invention in which an exclusive property or privilege is claimed are defined as follows:

1. The method of inhibiting premature vulcanization of a vulcanizable diene rubber containing a sulfur vulcanizing agent which comprises incorporating therein in an amount effective to inhibit premature vulcanization a compound of the formula selected from the group consisting of a. $(RSO_2N(R')S-)_{n'}$ R'' and b. RS—N(R')SO$_2$N(R')—SR where $n'$ is 2, 3 or 4, R is monovalent selected from the group consisting of aryl where aryl is phenyl, naphthyl or xenyl; substituted said aryl wherein the substituents are lower alkyl, halogen, lower alkoxy or combinations thereof; alkyl hydrocarbon of 1 to 20 carbon atoms; phenyl substituted lower alkyl hydrocarbon; unsubstituted mono- and bicycloalkyl of 5 to 12 ring members; lower alkyl substituted mono- and bicycloalkyl of 5 to 12 ring members and fused bicyclic rings of phenyl and a nonaromatic hydrocarbon ring; each R' independently is hydrogen or selected from the same group as R; R'' is hydrocarbon and when $n'$ is 2, R'' contains 1 to 12 carbon atoms and is alkylene, arylene or cycloalkylene; when $n'$ is 3, R'' is lower alkanetriyl or phenenyl; and when $n'$ is 4, R'' is lower alkanetetrayl.

2. The method of inhibiting premature vulcanization of a vulcanizable diene rubber containing a sulfur-vulcanizing agent which comprises incorporating therein in an amount effective to inhibit premature vulcanization a compound of the formula $(RSO_2N(R')S-)_{n'}$ R'' where $n'$ is 2, 3 or 4, R is monovalent selected from the group consisting of aryl where aryl is phenyl, naphthyl or xenyl; substituted said aryl wherein the substituents are lower alkyl, halogen, lower alkoxy or combinations thereof; alkyl hydrocarbon of 1 to 20 carbon atoms; phenyl substituted lower alkyl hydrocarbon; unsubstituted mono- and bicycloalkyl of 5 to 12 ring members; lower alkyl substituted mono- and bicycloalkyl of 5 to 12 ring members and fused bicyclic rings of phenyl and a nonaromatic hydrocarbon ring; R' is hydrogen or is independently selected from the same group as R; R'' is hydrocarbon and when $n'$ is 2, R'' contains 1 to 12 carbon atoms and is alkylene, arylene or cycloalkylene; when $n'$ is 3, R'' is lower alkanetriyl or phenenyl; when $n'$ is 4, R'' is lower alkanetetrayl.

3. The method according to claim 2 where the rubber contains an organic vulcanization accelerating agent and the vulcanizing agent is elemental sulfur.

4. The method of claim 3 in which $n'$ is 2.

5. The method of claim 4 in which R'' is lower alkylene.

6. The method of claim 5 in which R is p-tolyl, R' is methyl and R'' is dimethylene.

7. The method of inhibiting premature vulcanization of a vulcanizable diene rubber containing a sulfur-vulcanizing agent which comprises incorporating therein in an amount effective to inhibit premature vulcanization a compound of the formula

where each R is independently selected from the group consisting of aryl where aryl is phenyl, naphthyl or xenyl; substituted said aryl wherein the substituents are lower alkyl, halogen, lower alkoxy or combinations thereof; alkyl hydrocarbon of 1 to 20 carbon atoms; phenyl substituted lower alkyl hydrocarbon; unsubstituted mono- and bicycloalkyl of 5 to 12 ring members; lower alkyl substituted mono- and bicycloalkyl of 5 to 12 ring members and fused bicyclic rings of phenyl and a non-aromatic hydrocarbon ring, where each R' independently is hydrogen or selected from the same group as R.

8. The method of claim 7 where the rubber contains an organic vulcanization accelerating agent and the vulcanizing agent is elemental sulfur.

9. The method of claim 8 in which each R' is cyclohexyl, phenyl, hydrogen or lower alkyl and R is cycloalkyl.

10. The method of claim 9 in which R' is phenyl and R is cyclohexyl.

11. Diene rubber vulcanizable composition having improved resistance to prevulcanization comprising vulcanizable diene rubber containing a sulfur vulcanizing agent, an organic vulcanization accelerating agent and, in amount effective to inhibit prevulcanization, a compound of the formula selected from the group consisting of a. 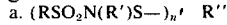

and b. 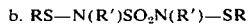

where $n'$ is 2, 3 or 4, R is monovalent selected from the group consisting of aryl where aryl is phenyl, naphthyl or xenyl; substituted said aryl wherein the substituents are lower alkyl, halogen, lower alkoxy or combinations thereof; alkyl hydrocarbon of 1 to 20 carbon atoms; phenyl substituted lower alkyl hydrocarbon; unsubstituted mono- and bicycloalkyl of 5 to 12 ring members; lower alkyl substituted mono- and bicycloalkyl of 5 to 12 ring members and fused bicyclic rings of phenyl and a nonaromatic hydrocarbon ring; each R' independently is hydrogen or selected from the same group as R; R'' is hydrocarbon and when $n'$ is 2, R'' contains 1 to 12 carbon atoms and is alkylene, arylene or cycloalkylene; when $n'$ is 3, R'' is lower alkanetriyl or phenenyl; when $n'$ is 4, R'' is lower alkanetetrayl.

12. Diene rubber vulcanizable composition having improved resistance to prevulcanization comprising vulcanizable diene rubber containing a sulfur vulcanizing agent, an organic vulcanization accelerating agent and, in amount effective to inhibit prevulcanization, a compound of the formula

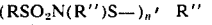

where $n'$ is 2, 3 or 4, R is monovalent selected from the group consisting of aryl where aryl is phenyl, naphthyl or xenyl; substituted said aryl wherein the substituents are lower alkyl, halogen, lower alkoxy or combinations thereof; alkyl hydrocarbon of 1 to 20 carbon atoms; phenyl substituted lower alkyl hydrocarbon; unsubstituted mono- and bicycloalkyl of 5 to 12 ring members; lower alkyl substituted mono- and bicycloalkyl of 5 to 12 ring members and fused bicyclic rings of phenyl and a non-aromatic hydrocarbon ring; R' is hydrogen or is independently selected from the same group as R; R'' is hydrocarbon and when $n'$ is 2, R'' contains 1 to 12 carbon atoms and is alkylene, arylene or cycloalkylene; when $n'$ is 3, R'' is lower alkanetriyl or phenenyl; when $n'$ is 4, R'' is lower alkanetetrayl.

13. The composition of claim 12 where the accelerating agent is a thiazole accelerator, aryl guanidine accelerator, thiuram sulfide accelerator, dithiocarbamate accelerator or mixture thereof.

14. The composition of claim 13 where the accelerating agent is a benzothiazolesulfenamide accelerator.

15. The composition of claim 14 in which $n'$ is 2.

16. The composition of claim 15 in which R'' is lower alkylene.

17. The composition of claim 16 in which R is p-tolyl, R' is methyl and R'' is dimethylene.

18. Diene rubber vulcanizable composition having improved resistance to prevulcanization comprising vulcanizable diene rubber containing a sulfur vulcanizing agent, an organic vulcanization accelerating agent and, in amount effective to inhibit prevulcanization, a compound of the formula

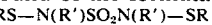

where each R is independently selected from the group consisting of aryl where aryl is phenyl, naphthyl or xenyl; substituted said aryl wherein the substituents are lower alkyl, halogen, lower alkoxy or combinations thereof; alkyl hydrocarbon of 1 to 20 carbon atoms; phenyl substituted lower alkyl hydrocarbon; unsubstituted mono- and bicycloalkyl of 5 to 12 ring members; lower alkyl substituted mono- and bicycloalkyl of 5 to 12 ring members and fused bicyclic rings of phenyl and a non-aromatic hydrocarbon ring, where each R' independently is hydrogen or selected from the same group as R.

19. The composition of claim 18 where the accelerating agent is a thiazole accelerator, aryl guanidine accelerator, thiuram sulfide accelerator, dithiocarbamate accelerator or mixture thereof.

20. The composition of claim 19 where the accelerating agent is a benzothiazolesulfenamide accelerator.

21. The composition of claim 20 in which each R' is cyclohexyl, phenyl, hydrogen or lower alkyl and R is cycloalkyl.

22. The composition of claim 21 in which R' is phenyl and R is cyclohexyl.

* * * * *